United States Patent Office 2,868,700
Patented Jan. 13, 1959

2,868,700

MANUFACTURE OF CYCLOPENTADIENYL MANGANESE CARBONYL COMPOUNDS

Jerome E. Brown, Detroit, and Earl G. De Witt, Royal Oak, Mich., and Hymin Shapiro, Baton Rouge, La., assignors to Ethyl Corporation, New York, N. Y., a corporation of Delaware No Drawing. Application July 24, 1957
Serial No. 673,764

5 Claims. (Cl. 202—56)

This invention relates to the manufacture of organo metal carbonyl compounds and more particularly to the separation and recovery of cyclopentadienyl manganese tricarbonyl compounds, and especially alkyl-cyclopentadienyl manganese tricarbonyls.

Cyclopentadienyl manganese tricarbonyl compounds have been found to be exceptionally effective antiknocks for use in fuel, for spark plug ignition internal combustion engines. These compounds not only have exceptional effectiveness as antiknocks but also many of these compounds, principally the liquid compounds have auxiliary properties which make them entirely practical and desirable for commercial use. These auxiliary properties include high solubility in fuels, such as gasoline, and thermo-stability either alone or in gasolines which makes these compounds entirely satisfactory for use under the widely varying conditions to which gasoline and other fuels are normally subjected. Possibly of even greater importance, these compounds do not tend to form any appreciable deposits on the engine piston, valves and spark plug surfaces and likewise are not abrasive to the engine parts as are characteristic of iron compounds.

A preferred method of manufacture of these cyclopentadienyl manganese tricarbonyl compounds comprises reacting carbon monoxide with a bis(cyclopentadienyl) manganese compound, e. g. bis(methylcyclopentadienyl) manganese. In this reaction, only one of the two cyclopentadienyl radicals in the bis-compound is used in forming the product. The other cyclopentadienyl radical is lost as byproduct, normally polymerizing to a soft sticky material. This byproduct causes difficulty in subsequent recovery of the cyclopentadienyl manganese tricarbonyl as hereinafter described.

The bis(cyclopentadienyl) manganese compound is normally made by reaction of a cyclopentadienyl sodium compound or other alkali metal compounds with a manganous chloride or other salt. Sodium chloride is formed as a byproduct, two moles per mole of the bis (manganese) product. The carbon monoxide is normally added directly to this reaction product, forming a second reaction product containing the desired cyclopentadienyl manganese tricarbonyl but also containing, frequently as the major constituent, impurities including the polymer, sodium salts, unreacted manganese salts and the like.

It is accordingly an object of this invention to provide an improved method for manufacture of cyclopentadienyl manganese tricarbonyl compounds. Another object is to provide a satisfactory method for the recovery and separation of these compounds from a reaction product containing inorganic and polymeric impurities. A more specific object is to provide a simple and convenient method of separating cyclopentadienyl manganese carbonyl compounds from the reaction product, which method provides a high ultimate yield of product and which provides easy and cheap disposal of a byproduct residue. A specific object is to provide a method of the above type suitable for large scale commercial production of cyclopentadienyl manganese tricarbonyls, particularly methylcyclopentadienyl manganese tricarbonyl. Other objects and advantages of this invention will be apparent for the following description and appended claims.

These and other objects of this invention are accomplished if the cyclopentadienyl manganese carbonyl compound is distilled from the reaction product while maintaining the byproduct in a fluid state in a suspending agent selected from the group consisting of polyethylene glycol ethers, polyamines and aromatic compounds. More specifically, the reaction mixture, normally containing about equal quantities of the desired cyclopentadienyl manganese tricarbonyl product, solvent, and impurities such as polymer and salts, is first subjected to a simple distillation, either atmospheric or vacuum, to remove the major quantities of the solvent and lower boiling impurities, such as unreacted cyclopentadiene compound. The bottoms from this distillation is thereafter distilled or fractionated in the presence of the suspending agent of this invention to separate and recover the desired cyclopentadienyl manganese tricarbonyl product. When high boiling solvents are employed, the sequence of the distillations are reversed.

The suspending agent can be added at any time prior to the product distillation. The quantity of suspending agent can vary within a rather broad range, from about 0.1 to 2.0 per part of product but preferably is used in a concentration of from 0.5 part to 3.0 per part of product. Best results are obtained when only sufficient suspending agent is employed to maintain the polymeric and inorganic residue in a fluid state under operating conditions which permits easy removal from the distillation equipment, usually below 1.0 part per part of product e. g. methylcyclopentadienyl manganese tricarbonyl. Since, it is frequently desired to burn the byproduct residue prior to disposal, sufficient suspending agent is employed to supply the necessary fuel to accomplish essentially complete combustion of this residue. At the same time, however, the minimum suspending agent for this purpose should be used for economic reasons.

The above process is surprisingly effective in accomplishing essentially complete recovery of the desired cyclopentadienyl manganese tricarbonyl product in view of the very large quantities and nature of the byproduct. Possibly of even greater importance, the byproduct, in spite of its high inorganic content, remains as a very fluid liquid or slurry which can easily and readily be removed from the separation equipment.

The aromatic hydrocarbons, such as is obtained in many petroleum or coal tar distillation refinery cuts, are particualrly suitable as suspending agents since these materials are readily available and cheap. They are also highly combustible such that disposal of the residue by burning is readily and economically accomplished. Moreover, relatively small quantities of these aromatic hydrocarbon materials will suspend unexpectedly large quantities of the residue, giving a highly fluid slurry which can be easily handled.

The following examples illustrate the many advantages of the process of the present invention. All quantities are given as parts by weight. These examples are for the purpose of illustration and not of limitation.

EXAMPLE I

A reaction product (970 parts) containing methylcyclopentadienyl manganese tricarbonyl, inorganic salts including sodium and manganous chlorides and polymeric material dissolved in diethylene glycol dimethyl ether was placed in a distillation vessel provided with a column having 5 plates. A reflux ratio of 0.5:1 was employed. The distillation equipment was provided with heating means and a stirrer. The pressure of the vessel was reduced to about 30 millimeters of mercury and the reaction product was heated to provide an overhead temperature up to about 70–80° C. Under these conditions, the major quantity of the diethylene glycol dimethyl ether was distilled. The pressure thereafter was reduced to 20 millimeters of mercury and the temperature maintained between about 80–110° C. Under these conditions, a hydrocarbon fraction, predominantly methylcyclopentadienyl dimer, was distilled and recovered. To the distillation pot was then added 309 parts of Enjay aromatic HB Form 9700, a commercially available product made by Esso Standard Oil Company, which is predominantly aromatic hydrocarbon containing both benzene and naphthalene derivatives. This mixture has an initial boiling point of about 145° C. at 20 millimeter mercury pressure.

The temperature of the distillation was then increased to give an overhead temperature above about 110° C. under which conditions the methylcyclopentadienyl manganese tricarbonyl distilled. The methylcyclopentadienyl manganese tricarbonyl and solvent were both recovered in essentially 100 percent yield. Small quantities of the suspending agent vaporized toward the end of the distillation to purge the column of the desired product. The distillation bottoms were highly fluid at the distillation temperature and could be readily drained from the distillation vessel. The residue remained highly fluid even after being cooled to room temperature. After several days the residue thickened slightly.

The reaction product treated above was prepared by reaction of 13.95 parts of methylcyclopentadienyl monomer with 3.36 parts of sodium in diethylene glycol dimethylether (9.5 parts) at about 110° C. Upon completion of this reaction, 9.15 parts of manganous chloride were added and this mixture was stirred for a period of approximately 1 hour at 127° C. To this reaction product was added 5.80 parts of carbon monoxide at a temperature of 193° C. The reaction was complete in less than ½ hour. Vigorous agitation was employed in all of the above reactions.

EXAMPLE II

Example I was repeated using the same reaction product but only 260 parts of the Enjay aromatic HB suspending agent were used for 1309 parts of reaction product. The temperatures of the distillation were essentially the same and again the recovery of the manganese product and the solvent were essentially theoretical. In this case, the distillation bottoms were less fluid at 100° C. but the material could be satisfactorily removed from the distillation equipment, particularly at elevated temperatures.

Example I was repeated except that 286 parts of the suspending agent were employed with 1023 parts of reaction product. In this case the suspending agent completely purged the product from the distillation equipment and essentially complete recovery of the product and solvent were obtained. The distillation bottoms only slightly thickened on cooling to room temperature.

When 374 parts of the suspending agent were used for 1095 parts the distillation residue was very fluid even at room temperature.

EXAMPLE III

Example I was repeated except that 300 parts of X–1 Resinous Oil, a commercial product manufactured by Neville Chemical Company, was employed with 997 parts of the reaction mixture. In this case most of the product was removed from the column by the distillation of the suspending agent giving a yield of product of 85.3. The distillation residue was pourable hot but became somewhat thick at 115° C.

EXAMPLE IV

Example I was repeated except that a commercially available hydropolymer of ethylene (Ethyl Corporation, Baton Rouge, La.) consisting essentially of a low hydrocarbon polymer produced in a process for the hydrochlorination of ethylene, using aluminum chloride catalyst, was employed as the suspending agent. 415 parts of hydropolymer were used with 933 parts of reaction product. Essentially complete recovery from the reaction product and column of both the product and solvent were obtained.

EXAMPLE V

The reaction mass (1500 parts) from a series of reactions similar to that described in Example I was placed in distillation equipment provided with a 20 plate column having a vacuum and a distillate collector. The pressure in the equipment was reduced to about 30 millimeters of mercury and the contents were heated to a temperature of 70–60° C. using a reflux ratio of 4:1. 425 parts of volatile material was recovered which analyzed at 97 percent diethylene glycol dimethyl ether, 500 parts of Dowtherm A (a mixture of diphenyl ether and diphenyl) were then added to the remaining reaction product while maintaining the column under total reflux. The temperature of the column was thereafter raised from 76 to 108° C., again using a 4:1 reflux ratio but employing a pressure of only 20 millimeters of mercury. 127 parts of distillate were recovered which consisted primarily of a hydrocarbon fraction but contained relatively small quantities of diethylene glycol dimethyl ether and methylcyclopentadienyl manganese tricarbonyl. The temperature was thereafter raised from 108 to 127° C., using a reflux ratio of ½:1 and a distillate cut of 636.7 parts were obtained which contained 73.9 percent methylcyclopentadienyl manganese tricarbonyl. The temperature of the column was thereafter increased to 131° C. using the same pressure and reflux ratio and 124.2 parts of distillate were recovered containing small quantities of the methylcyclopentadienyl manganese tricarbonyl product. In the several cuts essentially complete recovery of the manganese compound was obtained and about 80 percent of the diethylene glycol dimethyl ether (97 percent pure) was recovered.

When the above example is repeated using a higher reflux ratio i. e. 1:1 and 4:1 appreciably purer manganese compound is recovered in the third cut. The purity of the manganese compound is also appreciably increased by employing higher temperature at higher pressures e. g. atmospheric pressure.

The following is a table which lists Examples VI–VII. These examples illustrate the process of this invention using different types of reaction products, solvents and suspending agents.

Table

| Example | Reaction Product | Solvent | Suspending Agent | Parts R. P/S. A[1] |
|---|---|---|---|---|
| VI | methylcyclopentadienyl manganese tricarbonyl. | tetrahydrofuran | dibutylacetamide | 3 |
| VII | cylopentadienyl manganese tricarbonyl. | diethylene glycol diethyl ether | diphenyl amine | 2.5 |
| VIII | methylcyclopentadienyl manganese tricarbonyl. | diethylene glycol dibutyl ether | diethylene glycol dibutyl ether. | 5 |
| IX | indenyl manganese tricarbonyl | diethylene glycol dimethyl ether | diethyl adipate | 1.75 |
| X | fluorenyl manganese tricarbonyl | tetrahydrofuran | diamyl phenol | 4 |
| XI | n-octylcyclopentadienyl manganese tricarbonyl. | tetraethylene glycol dimethyl ether. | methylated naphthalene. | 4.5 |
| XII | methylcyclopentadienyl manganese tricarbonyl. | benzene | diphenyl | 4 |

[1] Parts by weight of reaction product (solvent free) per part of suspending agent.

The reaction products in Examples VI–XII inclusive above are in all cases prepared similar to the procedure of Example I except that carbon monoxide is reacted with the corresponding bis(cyclopentadienyl) compound in the indicated solvent. In all of the above examples, essentially complete recovery of the desired manganese compound is obtained and the residue is highly fluid and can be readily discharged from the distillation equipment.

A wide variety of suspending agents are suitable for the present invention including amides, amines, ethers, esters, phenols, thioethers and aromatic hydrocarbons. In general, the particular suspending agent is selected with a view to the boiling point of the particular product to be recovered and the boiling point of the suspending agent. Normally, it is desired to use a relatively inexpensive suspending agent having a boiling point of from about 20 to 100 degrees above the boiling point of the desired product. While lower and higher boiling point spreads can be tolerated, if the boiling point of the suspending agent is too low, some difficulty is encountered in separation of the suspending agent from the desired product. Likewise, if the boiling point is too high, the suspending agent does not serve the additional function of removing final quantities of the product from the distillation equipment. However, from an operability standpoint, purging of the equipment can be accomplished with any suspending agent which has an appreciable vapor pressure below the decomposition temperature of the particular manganese compound being recovered.

Typical examples of suitable suspending agents are aliphatic and aromatic amides, such as dibutyl acetamides and dimethyl benzamides; aliphatic and aromatic amines, such as triethylene tetraamine and diphenyl amine; ethers, such as diethylene glycol dibutyl ether, diphenyl ether, diphenoxy propane; esters such as diethyl adipate, dibutyl phthalate, dibutyl sulfate, diethyl sulfone, tributyl phosphate; phenols, such as diamyl phenol and phenolic fractions obtained in refinery operations; thio ethers, such as diphenyl sulfide; and aromatic hydrocarbons, such as alkylated naphthalene e. g. methylated naphthalene, alkylated benzenes, styrene polymers of low molecular weight, particularly dimers, trimers and tetramers and diphenyl.

The cyclopentadienyl manganese tricarbonyl which can be treated in accordance with the present invention include cyclopentadienyl manganese tricarbonyl and alkyl derivatives such as methylcyclopentadienyl manganese tricarbonyl and the higher alkyl substituents up to about 10 carbon atoms in the alkyl chain. Indenyl and fluorenyl manganese tricarbonyls can also be recovered by the process of this invention including the alkyl substituted derivatives of these compounds.

The distillation can be conducted at pressures from a very few millimeters of mercury up to atmospheric pressure and even higher. In general, reduced pressure is preferred since it permits lower distillation temperatures, although when the boiling point of the suspending agent and manganese compound are relatively close, pressure operation is sometimes desirable. The type of distillation equipment and, when plates are employed, the number of plates depends largely upon the particular manganese compound being recovered and the suspending agent employed. In some cases, it is desirable to obtain a pure product directly from the distillation of the product from the reaction product and, in other instances, it is preferred to obtain a crude manganese compound cut followed by subsequent fractionation of this material.

It is found that it is desirable to prevent any appreciable oxidation of the reaction product prior to the separation technique since oxygen appears to effect polymerization of the hydrocarbon impurity e. g. methylcyclopentadiene, which causes agglomeration and difficulty in separation or removal of the distillate bottoms from the distillation equipment. Accordingly, it is desired to feed the reaction product from the carbonylation reactor directly to the distillation equipment or to maintain an inert atmosphere, such as nitrogen, over the reaction product at all times prior to the separation operation.

Many cyclopentadienyl manganese tricarbonyl compounds can be recovered in accordance with the present invention in addition to those given in the above examples. In general, cyclopentadienyl or substituted cyclopentadienyl compounds containing a total of from about 5–20 carbon atoms can be produced by this invention. The cyclopentadienyl radical can be alkyl substituted or can be of the indenyl or fluorenyl type, including the alkyl derivatives of the latter type compounds.

The preferred cyclopentadienyl manganese tricarbonyl compounds of this invention contain cyclopentadienyl radicals containing from 5 to 13 carbon atoms. These compounds have molecular weights up to about 315. Examples of these preferred cyclopentadienyl manganese tricarbonyl compounds includes methylcyclopentadienyl manganese tricarbonyl, cyclopentadienyl manganese tricarbonyl, indenyl manganese tricarbonyl, ethylcyclopentadienyl manganese tricarbonyl, n-octyl-cyclopentadienyl manganese tricarbonyl, phenylmethylcyclopentadienyl manganese tricarbonyl, and the like.

The above cyclopentadienyl manganese tricarbonyl compounds can be prepared from corresponding bis(cyclopentadienyl) alkali metal compounds. For example, cyclopentadienyl manganese tricarbonyl is prepared by the reaction of carbon monoxide with bis(cyclopentadienyl) manganese. Likewise, methylcyclopentadienyl manganese tricarbonyl is prepared by reacting carbon monoxide with bis(methylcyclopentadienyl) manganese. Thus, corresponding cyclopentadienyl manganese tricarbonyl compounds can be prepared from bis(ethylcyclopentadienyl) manganese, n-octyl cyclopentadienyl manganese, bis-indenyl manganese, bis-fluorenyl and the like.

The above cyclopentadienyl manganese tricarbonyl compounds can be prepared by a number of processes and, in general, are synthesized in three separate steps. An alkali metal (e. g. sodium, potassium or lithium) cyclopentadienyl compound is prepared by reaction of the corresponding alkali metal with the cyclopentadiene hydrocarbon in a suitable solvent, such as a hydrocarbon, ether, or other inert solvent, e. g. toluene, alkyl glycol ethers, such as diethylene glycol dimethyl ether or tetrahydrofuran. This reaction is conducted with agitation at a temperature of from 0° to 250° C. preferably above 100° C., using either the cyclopentadiene monomer or dimer. Other suitable methods are disclosed in British 763,047 and U. S. 2,777,887. This reaction mixture is then reacted with a manganous salt. Suitable manganous salts are halides, such as the chloride or a bromide, manganous sulfate or organic salts, such as the acetate. In general, this reaction is conducted in ether type solvents, such as those discussed above, at a temperature of 100° to 250° C., usually from 130° to 175° C. This second reaction product is then reacted with carbon monoxide usually at pressures of from 100 to 500 lbs./sq. in., although both lower and higher pressures can be used. This carbonylation reaction is normally conducted at temperatures of from 150 to 250° C. using agitation.

The manganese compound can be subjected to fractionation and the purified product thereafter blended with gasoline. The following Table I presents data showing the octane increase of a commercial gasoline having an initial boiling point of 94° F. and a final boiling point of 390° F. The antiknock value of the fuel as determined by the ratings are given in octane numbers for figures below 100 and in Army-Navy performance numbers for values above 100. The method of determining performance numbers is explained in the booklet "Aviation Fuels and their Effect on Engine Performance," NAVAER–06–5–501, USAF T. O. No. 06–5–54, published in 1951.

*Table I*

| $C_6H_7Mn(CO)_3$, g. metal/gal.: | Octane rating |
|---|---|
| 0 | 83.1 |
| 1.0 | 92.7 |
| 2.0 | 95.8 |
| 3.0 | 98.0 |
| 5.0 | 102.0 |

We claim:

1. In a process for producing a cyclopentadienyl manganese tricarbonyl compound wherein an alkali metal cyclopentadienyl compound is reacted with a manganese compound, and this reaction product is thereafter reacted with carbon monoxide, the improvement comprising distilling said cyclopentadienyl manganese tricarbonyl compound from the by-product formed during said reactions while maintaining said by-product in a fluid state in an aromatic hydrocarbon suspending agent having a boiling point of from about 20 to about 100° C. above the boiling point of said cyclopentadienyl manganese tricarbonyl compound.

2. The process of claim 1 wherein the suspending agent is employed in a concentration of from about 0.5 to 3.0 parts per part of said cyclopentadienyl manganese tricarbonyl product.

3. In a process for producing cyclopentadienyl manganese tricarbonyl compounds wherein an alkali metal is reacted with a cyclopentadiene hydrocarbon, the reaction product is then reacted with a manganese compound to form a cyclopentadienyl manganese compound and the latter reaction product is then reacted with carbon monoxide, said reactions being carried out in diethylene glycol dimethyl ether solvent, the improvement comprising distilling said cyclopentadienyl manganese tricarbonyl compound, ethylene glycol dimethyl ether solvent and unreacted cyclopentadiene hydrocarbon from the by-product formed during said reactions while maintaining said by-product in a fluid state in an aromatic hydrocarbon suspending agent having a boiling point from about 20 to 100° C. above the boiling point of said cyclopentadienyl manganese tricarbonyl compound.

4. The process of claim 3 wherein said cyclopentadiene hydrocarbon is cyclopentadiene.

5. The process of claim 3 wherein said cyclopentadiene hydrocarbon is methylcyclopentadiene.

No references cited